United States Patent [19]
Tachick et al.

[11] Patent Number: 5,574,610
[45] Date of Patent: Nov. 12, 1996

[54] ELECTRICAL ISOLATION DEVICE

[76] Inventors: Henry N. Tachick, W10848 W. 4th Rd., Pound, Wis. 54161; Brian R. Pelly, 1253 Via Landetta, Palos Verdes Estate, Calif. 90274

[21] Appl. No.: 323,271

[22] Filed: Oct. 14, 1994

[51] Int. Cl.$^6$ .................................................... H02H 9/00
[52] U.S. Cl. ............................................. 361/56; 361/111
[58] Field of Search .............................. 361/56, 111, 113, 361/117, 118; 257/355, 726, 727

[56] References Cited

U.S. PATENT DOCUMENTS

| | | |
|---|---|---|
| 3,636,409 | 1/1972 | Stephens, Jr. et al. |
| 3,769,926 | 11/1973 | Race. |
| 3,930,977 | 1/1976 | Wood. |
| 4,117,345 | 9/1978 | Balcom. |
| 5,016,088 | 5/1991 | Ermilov et al. ............................ 357/76 |
| 5,119,175 | 6/1992 | Long et al. ............................... 357/82 |

OTHER PUBLICATIONS

A letter from Henry N. Tachick of Dairyland Electrical Industries, Inc. to Randy D. Howard of Los Angeles Department of Water & Power describing a proposal for an isolator surge protector, dated Mar. 13, 1989.
Letter dated Dec. 3, 1993 from Paul Fleury of Marine Services to Technical Director, American Boat and Yacht Council, Inc.
Paper dated Jan. 3, 1993 entitled "Galvanic Isolator, Installation Instructions, Quicksilver Part #18478A1".
Paper dated Dec. 28, 1993 entitled "Testing Galvanic Isolators".
Paper dated Jan. 12, 1994 entitled "Galvanic Isolator".

*Primary Examiner*—Jeffrey A. Gaffin
*Assistant Examiner*—Sally C. Medley

[57] ABSTRACT

An electrical isolation device is connected at input terminals in lines between a structure to be cathodically protected and a ground, or between two cathodically protected structures, to block selected low levels of DC voltage while freely conducting normal AC currents and all fault currents. The device has two diode stacks, formed of layers, and the stacks are connected in parallel with one another in opposite polarity and in parallel with a capacitor across the input terminals of the device. Each diode layer include a junction wafer and a conducting metal disk. The layers in each stack are preferably pressed tightly together and to metal bus conductors by a clamp to maximize the contact of the diode layers to each other and to the conductors to minimize contact resistance. AC currents are conducted (e.g., to ground) through the capacitor while low level DC voltages are blocked by the cumulative threshold voltages of the plural diode layers connected in series in each of the stacks. When a large AC or DC fault occurs, the voltage across a stack exceeds the turn-on voltage of the stack so that fault currents are conducted to ground through the diode stacks. The number of diodes in each stack may be selected to provide a continued cathodic protection voltage in the presence of large AC fault currents. The diode stacks may also be connected together in a bridge structure to reduce the number of diodes required.

35 Claims, 7 Drawing Sheets

ELECTRICAL ISOLATION DEVICE

FIELD OF THE INVENTION

This invention pertains generally to devices for providing AC grounding or AC coupling of structures, isolating the structures from ground or from other structures for low levels of DC voltages, while allowing fault currents or lightning surge currents to pass freely.

BACKGROUND OF THE INVENTION

Situations exist in which it is desirable to isolate a metal structure from ground for low level DC voltages while allowing normal steady-state AC currents to pass freely. An example is cathodic protection for a metal structure to which a low level DC voltage is applied to protect the structure from corrosion. Such a protection system is commonly employed, for example, by power utilities to protect gas transmission and distribution lines, storage tanks, and metal coverings of high voltage cables. In such situations it is also desirable to effectively ground the structure to protect it from system faults which can otherwise cause large AC voltages to be present on the structure. The use of a conventional grounding system, in which the structure would be connected directly to ground, would, of course, result in the loss of DC isolation for the cathodically protected structure. Comparable problems are encountered where boats are supplied with shore based power. If a conventional third wire conductor is used to ground a metal hull or other underwater structure, a galvanic circuit is formed between the boat and shore located metal structures. If the boat hull is an aluminum hull, or the boat is equipped with aluminum outdrives or outboard motors, the aluminum tends to become a sacrificial anode which will corrode away.

For such situations, it is desirable to utilize a grounding system which prevents low levels of DC current from leaking into or out of the protected structure while at the same time allowing normal AC currents to freely pass from the structure to ground. It is also desirable that, in the event of a fault, the fault current will also be passed freely to ground, though DC isolation may be momentarily interrupted. Polarization cells have been developed to perform this function, but such cells use potentially hazardous electrolytes which can be harmful to equipment, personnel and the environment. Such polarization cells also require regular maintenance.

A solid state device performing a function similar to a polarization cell for marine ground isolation is shown in U.S. Pat. No. 3,636,409. This device provides a ground filter for a boat or other vessel which is obtaining electrical power from a shore-based source while at dock where it is desirable that the hull of the vessel be AC grounded to protect the crew from hazardous shocks resulting from faults in the AC power supply system. The device shown in U.S. Pat. No. 3,636,409 uses a capacitor to provide AC grounding. Two sets of diodes are connected in parallel with the capacitor to conduct in opposite directions, with each set being formed of two separate series connected diodes which block low DC voltages but pass large DC and AC fault currents. Other devices having a similar purpose are shown in U.S. Pat. Nos. 3,769,926, 3,930,977 and 4,117,345.

Electrical isolation devices are also used for purposes other than ground isolation. For example, such a device may be used to provide AC continuity between cathodically protected structures separated by an insulated joint, such as an insulated flange on a pipeline. The device would provide AC continuity to the structures while isolating them from each other with respect to DC.

SUMMARY OF THE INVENTION

The electrical isolation device in accordance with the present invention blocks selected low levels of DC voltage while freely conducting AC up to a predetermined magnitude of AC current. AC fault currents are also freely conducted with usually a momentary interruption of DC isolation. The device is rugged and compact, and uses low maintenance passive solid-state components.

In a preferred embodiment, the device includes two diode stacks connected in opposite polarity in parallel with each other and with a capacitor, all of which are contained in an enclosure. Each of the diode stacks is comprised of one or more diode layers. Each diode layer is formed of a semiconductor diode junction wafer and typically at least one additional conducting disk such as a conducting metal (e.g., molybdenum) disk and/or a heat sink metal disk. The semiconductor diode junction wafer is the die, or junction only, of a conventional semiconductor power diode with no packaging, heat sinking or connectors. Because the diode stack contains only the diode wafers, a lower cost and more compact product is obtained for a given electrical rating than would be possible with separately packaged and connected diodes. Furthermore, by incorporating the diode wafers in a stack with connections between diodes provided by large surface area contact conductors, the connection resistance of the series connected combination of diodes is minimized, thereby minimizing the voltage drop across the stack of diodes when the stack is conducting very large fault currents. Moreover, the compactness of the diode stack assembly reduces inductance and voltage spikes. The diode junction stacks are held together under high pressure, to maximize electrical contacts between the wafers and the metal conducting disks, by means of a clamping assembly.

The diode stacks may be configured and arranged in various ways. For example, the diode stacks may be arranged in a bridge configuration, thereby achieving a desired level of DC isolation with a fewer number of diodes. In another alternate arrangement the number of diodes in each stack need not be equal. In such a case, the number of diodes in each stack is chosen such that, although DC isolation is not maintained in the presence of AC fault currents, the average DC voltage across the isolation device in the presence of large AC fault currents is at a desired level to maintain cathodic protection. This diode arrangement may also be used, without a paralleled capacitor, to provide DC cathodic protection voltage to a protected structure by applying a steady AC voltage to that structure.

The isolation device is constructed to be rugged and reliable, with little or no maintenance required over its lifetime. Solid, rigid conductors having very low resistance are preferably used to connect the components of the isolation device. Although very high currents may be conducted under fault conditions, the very low resistance connections result in very little potential difference between any of the parts within the casing for the device. Preferably, the conductors are connected to the input terminal lugs, to the diode stacks, and to the capacitor with large surface area, high pressure contact without requiring soldering to provide excellent contact reliability with very low contact resistance.

Further objects, features and advantages of the invention will be apparent from the following detailed description when taken in conjunction with the accompanying drawings.

DETAILED DESCRIPTION OF THE INVENTION

Figure 1:
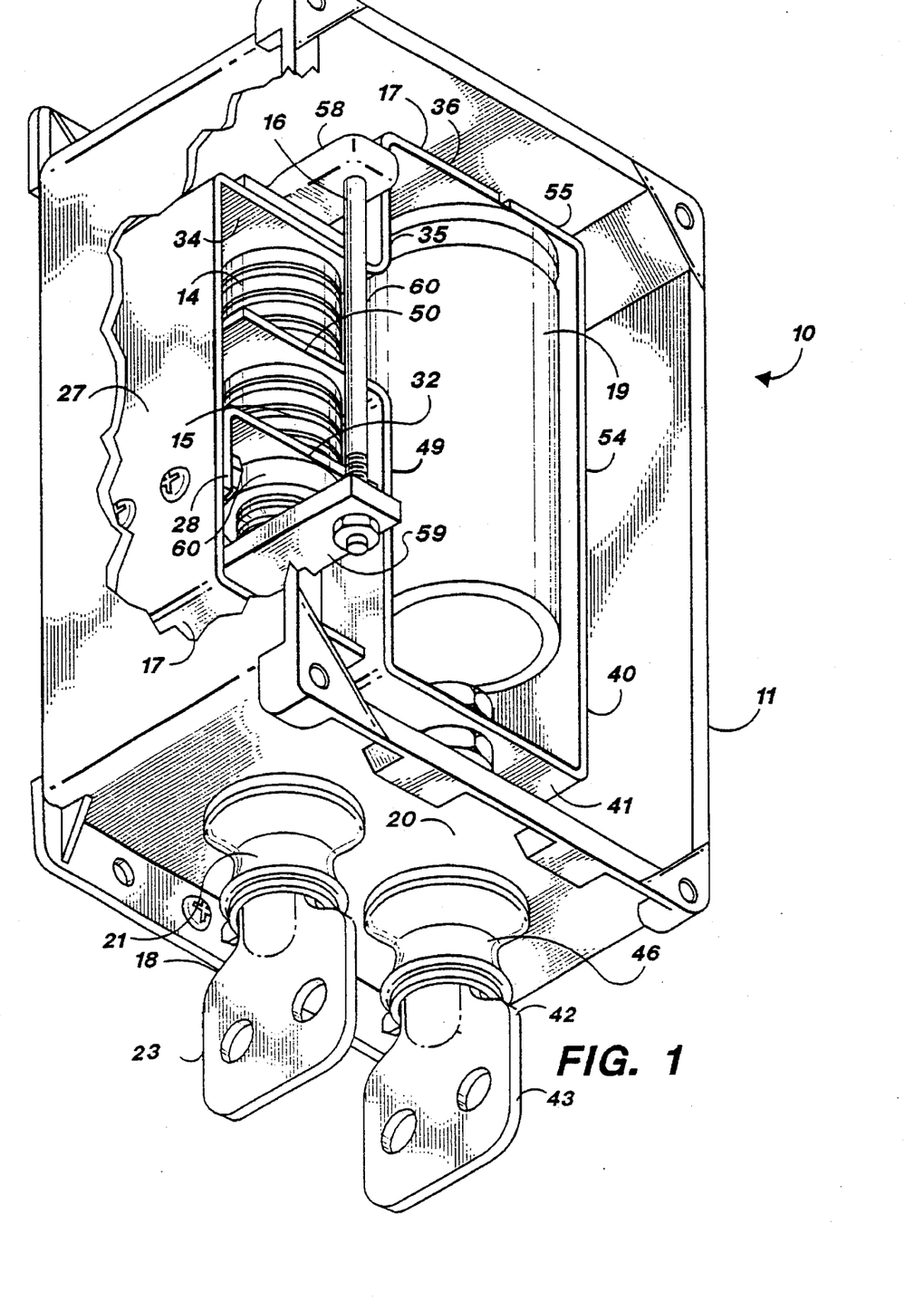
FIG. 1 is a perspective view of the electrical isolation device of the invention with the front cover removed and part of the rest of the enclosure broken away.

With reference to the drawings, an electrical isolation device in accordance with the present invention is shown generally at 10 in FIG. 1. The isolation device 10 includes an enclosure box or casing 11 (which would be closed with a removable front cover, not shown) within which are contained electrical components including two diode stacks 14 and 15, and a bipolar capacitor 19. The capacitor 19 preferably has a very large capacitance to provide low AC impedance, and a relatively high rms current capability at low voltage. The use of a bipolar capacitor is preferred so that AC current may be conducted through the capacitor regardless of the DC bias across the capacitor and regardless of the instantaneous polarity of voltage. The two diode stacks 14 and 15 are held in a clamp assembly 16. The clamp assembly 16 serves to hold the diode stacks together and to connect them in parallel with each other as described further below. A first electrical connection bus 17 provides a connection between the capacitor 19, the first diode stack 14, and a first input terminal 18 of the ground isolation device. The input terminal 18 includes a large flat lug 23 which extends outwardly from the enclosure 11 and can be connected to external electrical lines, such as a grounding strap or wire. The conducting metal of the input lug 23 extends through a bottom wall 20 of the enclosure 11 (which may be formed of an insulator such as glass fiber reinforced polyester or can be a metal cabinet), with an insulating block 21 preferably used to enclose the conductor of the lug 23 at its junction with the bottom wall 20 of the case. A connecting nut 22 is used to secure the structure of the input terminal firmly in place on the bottom wall 20, with an insulator 21 extending up into the interior of the casing surrounding the conductor 24 extending from the lug 23. An electrical connection is made between the conductor 24 (and thus to the lug 23) and a straight flat section 25 of the conducting bus 17 by a pair of nuts 26 which are threaded onto the conducting post 24. The nuts 26 are tightened down on the section 25 of the conductor 17 to provide a tight contact connection. The nuts 26 are electrical conductors, e.g., brass, and thus provide a good electrical connection between the conductors 17 and the input terminal post 24.

The bus bar conductor 17, which is preferably rigid and formed of a good conducting metal such as copper, has another straight section 27 which extends upwardly from the section 25, and to which is joined a stub section 28, bolted to the section 27 by a nut and bolt 30, which includes a straight flat section 32. Thus, the section of the conductor 32 is in electrical contact with the conductor 17, and thus with the input terminal 18. The conductor 17 further has a second straight section 34 which is spaced above and parallel to the straight section 32. The conductor 17 further has a section 35 which extends upwardly from the section 34 and a laterally extending section 36 which is connected by a bolt 37 to one of the terminals 38 of the capacitor 19. The bolt 37 not only provides an electrical connection between the terminal 38 of the capacitor and the section 36 of the conductor 17, but also a structural connection. Thus, the capacitor 19 is supported physically, in part, by the conductor 17.

A second bus bar conductor 40 has a flat bottom section 41 which is connected to a second input terminal 42 which is formed in the manner similar to the first input terminal 18. The second input terminal 42 has a connecting lug 43 extending outside the enclosure 11, a post 44 extending upwardly therefrom through the bottom wall 20 of the enclosure, a connecting nut 45 which structurally connects the input terminal 42 to the bottom wall 20, an insulator 46 which surrounds the post 44, and two nuts 47 which are threaded onto the post 44 and which are tightened down onto the straight conductor section 41 to provide a good electrical and structural connection between the post 44 and the conductor 40. The second conducting bus bar 40 has an upright section 49 from which extends laterally a flat section 50 which is spaced intermediate the sections 32 and 34 of the first bus bar conductor and is generally parallel to the sections 32 and 34. The diode stacks 14 and 15 are mounted between the straight sections 34 and 50 and 32 and 50, respectively, as described further below. The conductor 40 also has an upright section 54 which extends upwardly from the right side of the bottom section 41 and a laterally extending section 55 which is electrically and structurally connected to a second input terminal 56 of the capacitor 19 by a bolt 57. Because the conducting bars 17 and 40 are strong, rigid metal structures, the capacitor 19 is physically supported by its connection at the input terminals 38 and 56 to the conducting bars 17 and 40. The connecting conductors 17 and 40 form a rigid structure with large surface areas and are tightly connected to the electrical components to minimize connection resistances. These buses are preferably formed of, e.g., ⅛" thick by about 1¾" wide, copper with a thin (0.2–0.5 mm) electroplating of tin. Conducting buses of this width and thickness provide very low resistance and good structural rigidity.

Figure 2:
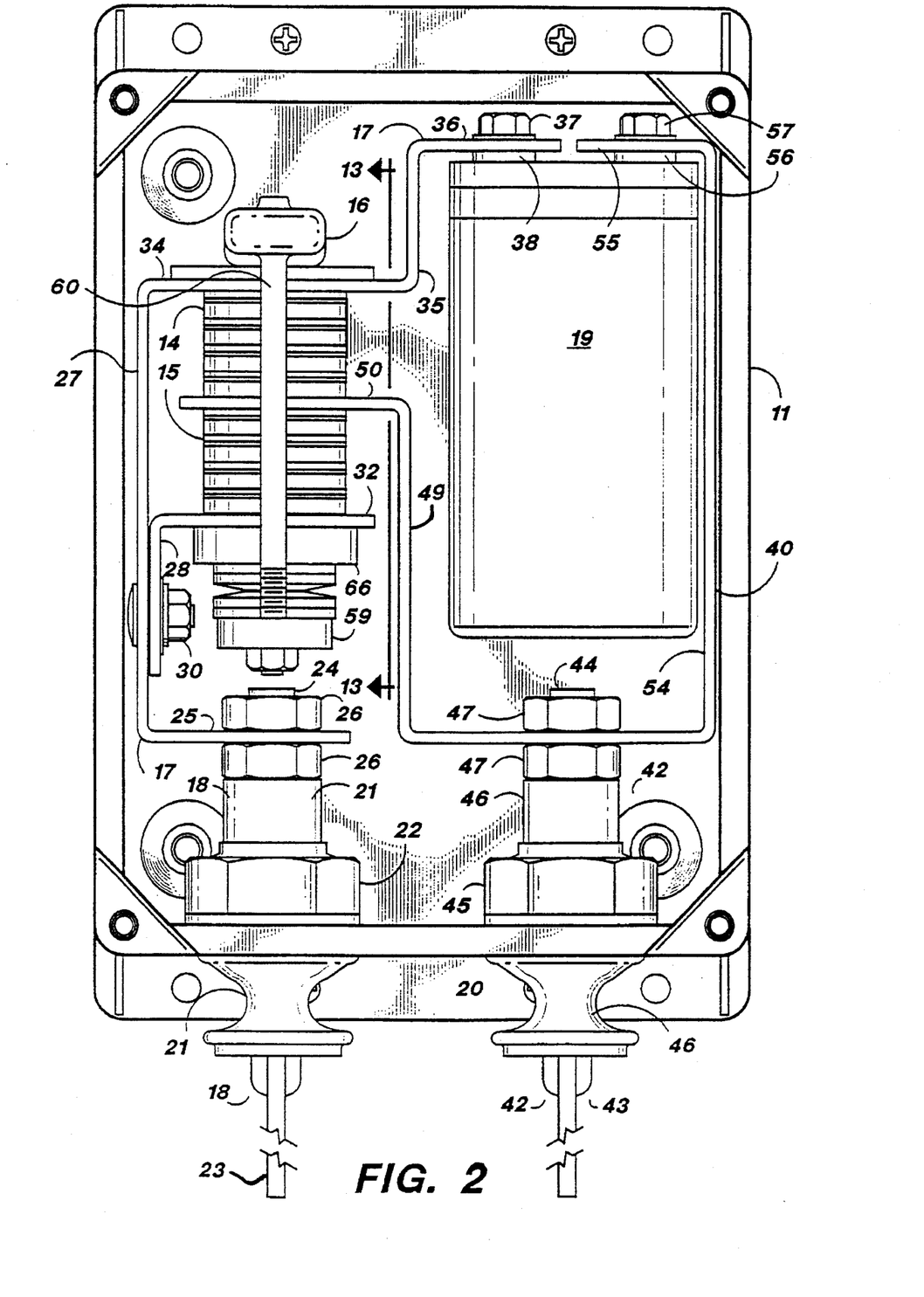
FIG. 2 is a plan view of the device of FIG. 1.
Figure 13:
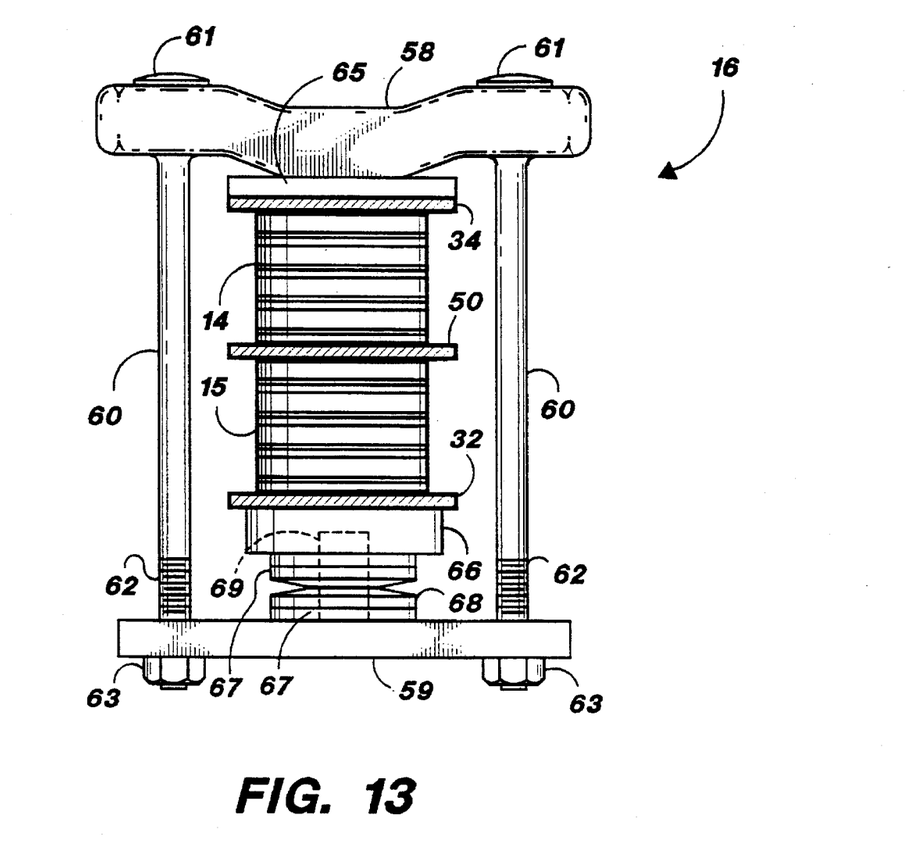
FIG. 13 is a view of the clamp assembly and diode stacks taken generally along the line 13—13 of FIG. 2.

The diode stacks 14 and 15 are connected to the conductor sections 34, 50 and 32 by the clamp assembly 16 so that they are electrically in parallel in opposite polarity to each other. The clamp assembly 16, as best illustrated in the views of FIGS. 1, 2 and 13, includes a top brace 58 and a bottom brace 59. Two bolts 16 extend through openings (not shown) in the top brace 58 and engage the top face of the top brace 58 with the head 61 of the bolts 60. The bolts 60 have threads 62 at their bottom ends, which extend through openings (not shown) in the bottom brace 59, and nuts 63 are threaded onto the threaded portions 62 of the bolts 60 to hold the bottom brace 59 in place on the bolts 60. A flat metal pressure plate 65 is mounted between the bottom of the top brace 58 and the conductor section 34 to transmit pressure evenly from the brace 58 to the surface of the conducting section 34. A bottom pressure plate 66 composed of a flat thick disk of metal is mounted in contact with the bottom conductor section 32 to apply evenly distributed pressure onto the surface thereof. Stacks of nested compression washers 67 and 68, extending around a post 69 mounted to the bottom brace 59, are engaged between the pressure plate 66 and the bottom brace 59. The number of compression washers used depends on the clamp pressure needed. The compression washers 67 and 68 compress to provide a very stiff spring action, and as the nuts 63 are tightened down onto the bolts 60, the brace 59 applies pressure through the washers 67 and 68 to the pressure plate 66 and thence to the conductor section 32 to apply a large, even pressure to the diode stacks 14 and 15 and the conductor sections 34, 50 and 32. The use of the compression washers 67 and 68 to provide a stiff spring allows the pressure applied to the diode stacks 14 and 15 to be adjusted by tightening the nuts 63. In addition, pressure will still be applied between the braces 58 and 59 to the diode stacks 14 and 15 and the conductors 34, 50 and 32 even if the nuts 63 loosen slightly over time with changes in temperature and jostling, or if the bolts 60 elongate slightly because of an increase in temperature or relaxation of the metal of the bolts. If the compression spring washers 67 and 68 were not used, and the diode stacks were mounted directly between the braces 58 and 59, a slight loosening of the nuts 63 or an elongation of the bolts 60 would substantially or perhaps entirely release the pressure on the diode stacks.

Although large surface area lugs 23 and 43 are shown for use in connecting to external conductors, other forms of terminal connections, such as eye bolt terminals or insulated flexible leads, may also be used depending on the specific application. The enclosure 11 may be made of metal, plastic or composites, such as fiberglass reinforced polyester, and it completely surrounds the internal components when a removable or non-removable cover (not shown) is in place. The space inside the enclosure 11 may be filled with an encapsulation material to protect the circuit components from impact damage and also make the device essentially waterproof. Use of encapsulation would generally be required for submersible applications of the device.

Figure 3:
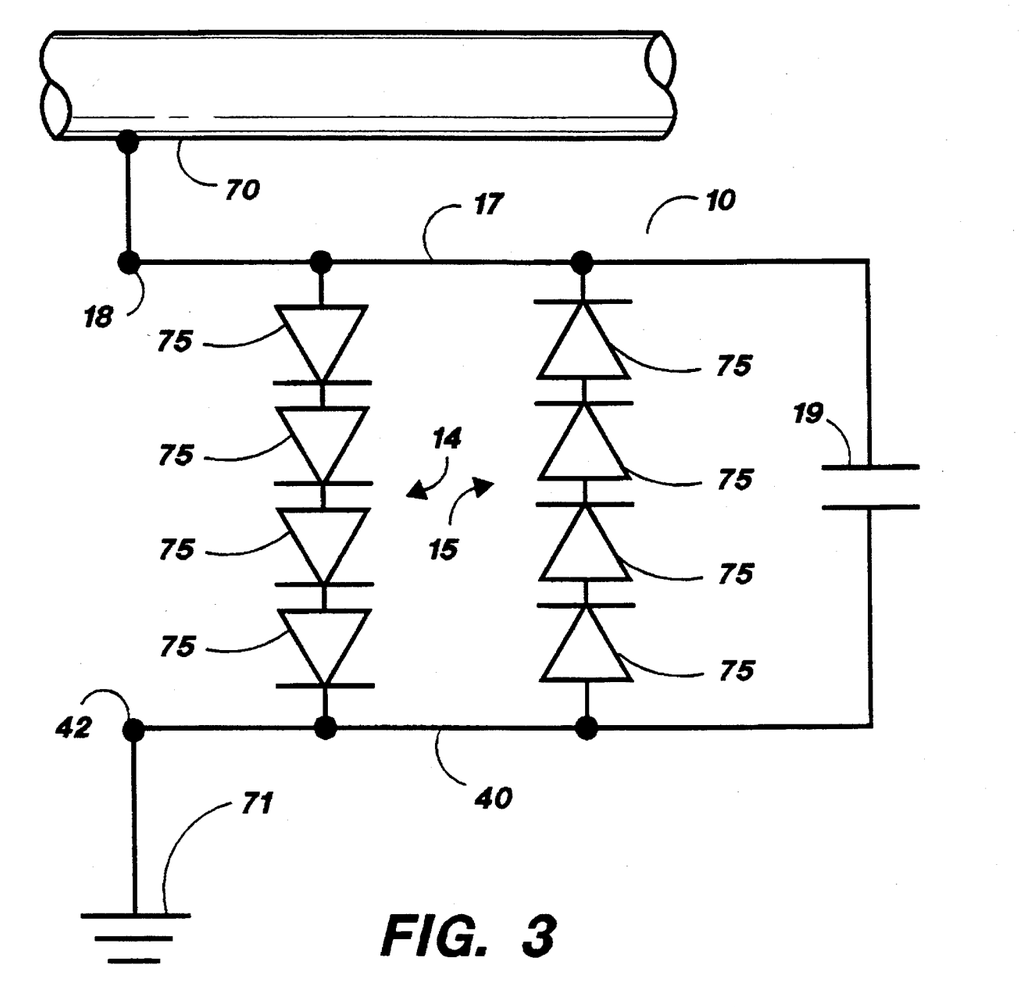
FIG. 3 is a circuit diagram showing the electrical connections of the components of the isolation device.

The circuit operation of the isolation device is illustrated with respect to the circuit diagram of FIG. 3. The isolation device 10 is typically connected between a structure 70 to be isolated (such as a cathodically protected pipe) and a ground 71, e.g., a grounding rod. The device 10 may also be connected between two cathodically protected structures to provide AC continuity between the structures. The isolation device circuit includes the two diode stacks 14 and 15 which are connected in parallel, and in opposite polarity to each other, across the conductors 17 and 40, and the bipolar capacitor 19 which is connected in parallel with the diode stacks.

For exemplification, FIG. 3 shows four diodes 75 in series comprising each diode stack 14 and 15. Each diode 75 in the structure has a forward threshold or cut-in voltage of about 0.45 volts before it conducts significant current in the forward direction. Since the capacitor 19 is an open circuit with respect to DC, the circuit shown in FIG. 3, having four such diodes 75 in series in each of the stacks 14 and 15, will provide DC current isolation of the structure to which it is connected up to approximately 1.8 volts DC in either direction. Very low levels of DC leakage current, 0.1 to 1.0 milliamperes, will typically be present in practice. At the same time, AC currents will pass freely through the capacitor. The peak AC voltage across the capacitor 19 should be less than the threshold voltage across the diode stacks 14 and 15, e.g., 1.8 volts. For example, for a normal AC current of 30 amperes rms at 60 Hz being conducted by the capacitor 19 with no DC bias, the capacitor should have a capacitance of at least about 70,000 µf to maintain the zero to peak voltage across the capacitor below 1.8 volts with no DC bias. In the presence of a DC bias on the capacitor, greater capacitance is required. An exemplary suitable capacitor is a United Chemi-Con 36DA207, having a capacitance of about 270,000 µf. Unipolar capacitors are capable of bipolar operation provided that the amplitude of the bipolar voltage is small in relation to the DC voltage rating.

For higher levels of AC currents (or DC currents), such as that resulting from a system fault, as the voltage across the capacitor 19 reaches 1.8 volts in each half cycle one of the diode stacks will be forward biased and current will be conducted through the diode stack either to ground 71 or between two structures where the device is used to provide AC continuity. Thus, the circuit provides for DC isolation in the presence of low levels of AC current while providing for effective grounding of the system in the case of system faults. Because the diode stacks 14 and 15 limit the voltage which can appear across the capacitor 19, the capacitor can have a relatively low voltage rating.

Figure 4:
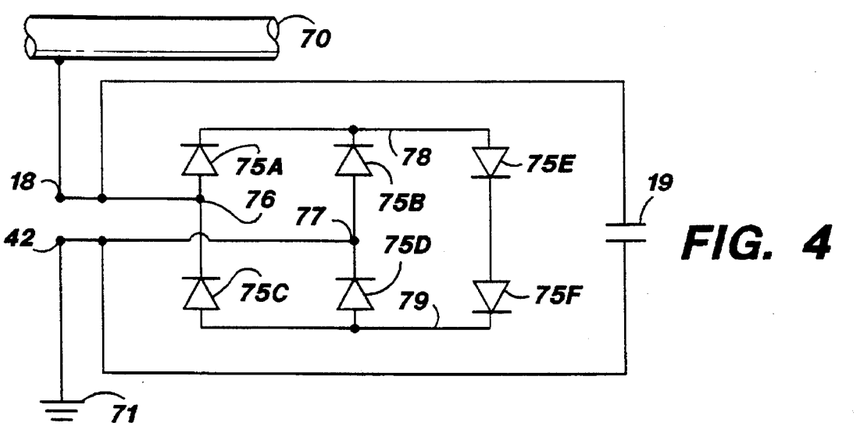
FIG. 4 is a circuit diagram showing an alternate arrangement of the components of the isolation device wherein the diodes are arranged in a bridge.

Alternate diode arrangements may also be used for the electrical isolation device. For example, FIG. 4 shows the isolation device circuit wherein the diodes have been arranged in a bridge configuration. This circuit formation provides the same degree of electrical isolation as the circuit shown in FIG. 3 but uses two fewer diodes. In this case four diodes are in series for either polarity. The bridge is formed across bridge AC terminals 76 and 77, which are connected to the input terminals 18 and 42, and bridge DC terminals 78 and 79, with one of the diodes 75A, 75B, 75C and 75D connected in each arm of the bridge. One or more diodes (two shown, 75E and 75F) are connected across the DC terminals 78 and 79. Isolation for positive polarity voltages is provided by the diodes 75A, 75E, 75F, and 75D. Isolation for negative polarity voltages is provided by the diodes 75B, 75E, 75F, and 75C. Thus, this circuit containing six diodes may provide the same degree of DC isolation as a circuit with eight diodes. However, in a fault current situation, the diodes 75E and 75F will be required to pass both polarities of surge current. This may require a higher rating for these two diodes. This configuration may also utilize a different arrangement of diode stacks and electrical conductors than described above. A single clamp assembly 16 may be used, although more than two diode stacks may be required, or the diode stacks may be placed side by side, rather than end to end, in the clamp assembly 16.

Figure 5:
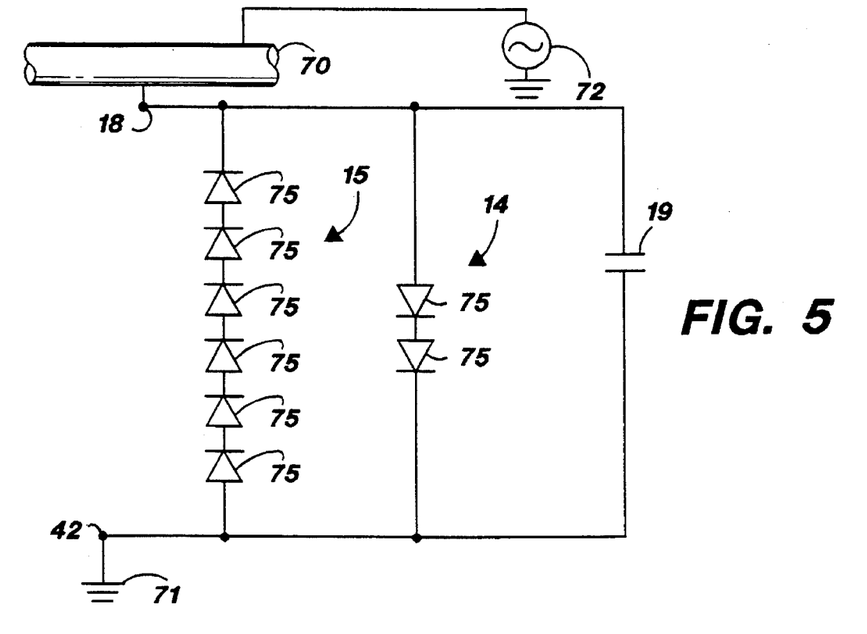
FIG. 5 is a circuit diagram showing an alternate arrangement of the components of the isolation device wherein there are an unequal number of diodes in each diode stack.

Another alternate diode arrangement for the isolation device is shown in FIG. 5. In accordance with this arrangement each diode stack 14 and 15 contains an unequal number of diodes 75. In an isolation device having an equal number of diodes 75 in each diode stack 14 and 15 (such as that shown in FIGS. 3 or 4) DC bias and cathodic protection voltage is lost when large AC fault currents are present. This is because in such a situation each diode stack will be conducting at the same voltage level on alternate half cycles and the net DC voltage across the device, and therefore on the protected structure, will be 0 volts. This is contrasted with the effect of a isolation device having an unequal number of diodes in each diode stack. For exemplification, FIG. 5 shows two diodes 75 in series comprising the diode stack 14 and six diodes 75 in series comprising the diode stack 15. Each diode 75 in the structure has a forward threshold or cut-in voltage of about 0.45 volts before it conducts in the forward direction. At low AC current the diodes are not conducting, AC current flows through the capacitor, and DC isolation is achieved as described above with respect to the symmetrical isolation device. When large AC fault currents are present on the isolation device the voltage across the device will be clamped at the cumulative voltage drop across two diodes during the positive half cycle of the AC fault current and at the cumulative voltage drop across six diodes during the negative half cycle of the AC fault current. Although the forward voltage blocking level per diode junction is typically about 0.45 volt for low levels of leakage current (e.g., 1–10 ma), when the diodes are forced into conduction from steady state AC power (or AC fault current), the forward voltage drop across each diode junction typically will be about 0.75 volt. Thus, with two diode junctions in one direction and six in the other, the positive peak voltage will be about 1.5 volts and the negative peak voltage will be about −4.5 volts. Therefore, the net DC voltage across the isolation device during periods of AC fault is about −1.5 volts. This voltage level provides very acceptable cathodic protection. Moreover, even if the original applied protection voltage was not at this level, it will be driven toward this level by the large AC currents. This is true whether the protection voltage was originally more negative or more positive then the final net voltage level achieved.

Figure 4A:
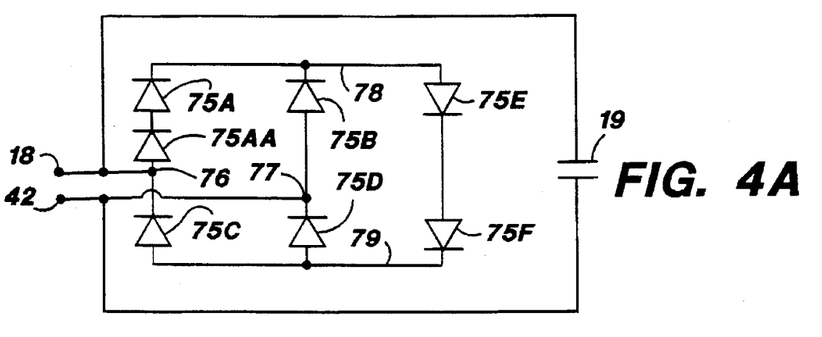
FIG. 4A is a circuit diagram of a modified form of the circuit of FIG. 4.

Conducting paths with unequal numbers of diodes may also be obtained where a bridge configuration is utilized, as illustrated in FIG. 4A in which two diodes 75A and 75AA are connected in series in the same arm of the bridge.

Thus, by properly selecting an unequal number of diodes in each diode stack, with the desired threshold voltage, cathodic protection can be maintained even in the presence of large AC fault currents. A circuit with unequal numbers of diodes also provides higher DC voltage blocking in the negative direction, which is preferable, but as a result is not polarity insensitive and care must be taken to install the device properly. A non-symmetrical diode configuration may also allow a reduction in the value of the capacitance of the capacitor 19. As the value of the capacitance of the capacitor 19 is reduced, more voltage will appear across the capacitor 19 for a given AC current. The diodes are thus likely to conduct at a lower level of AC fault current, or even at high levels of steady state AC current. However, this is less of a concern with the asymmetrical diode stack configuration in that when the diode stacks 14 and 15 are conducting, ideal cathodic protection voltage may still be maintained. In fact, use of asymmetrical diode stacks permits the capacitor 19 to be removed altogether if desired. Such an isolation device will present a high impedance to both AC and DC until the breakdown voltage of the diodes is reached. The breakdown voltages are selected so that high levels of AC current, steady state or fault, result in a net DC voltage across the device which is ideal for cathodic protection.

If the capacitor 19 is removed from an asymmetrical circuit, such as that shown in FIG. 5, the isolation device may be used to obtain a desired DC cathodic protection voltage level (approximately −0.70 volt to −2.50 volts.) on a metal structure to which an AC current is applied (or induced) from an AC source 72. The device 10 may be connected between the structure to be protected 70 and ground 71. When an AC voltage is applied to the structure 70 such that the AC current causes each diode stack 14 and 15 to conduct on alternating half cycles, the result will be a net DC voltage on the structure 70. The number of diodes, and the threshold voltage of each diode, in each diode stack can be selected to provide the desired DC cathodic protection voltage on the structure 70.

As described above, the diode stacks 14 and 15 are preferably connected together and to the electrical conductors 17 and 40 in a manner which minimizes the total number of connections required by the system, and the required connections are made in a manner which minimizes the connection resistance and inductance. This is desirable in a circuit of this nature which is intended to carry very large fault currents. In the presence of such large currents even small resistances or inductances at the connections between electrical components can result in large voltage drops.

To reduce connection resistances, it is desirable that the conducting buses 17 and 40 have large cross-sectional areas and be capable of direct and simple connection to the various device components and to the input terminals 18 and 42. It is preferred that the bus bar conductors 17 and 40 are connected to the diode stacks 14 and 15, and the components of the diode stacks are connected to each other, with large area surface contact to minimize connection resistance in a manner which requires no intervening connection devices.

Figures 8, 9, 10:
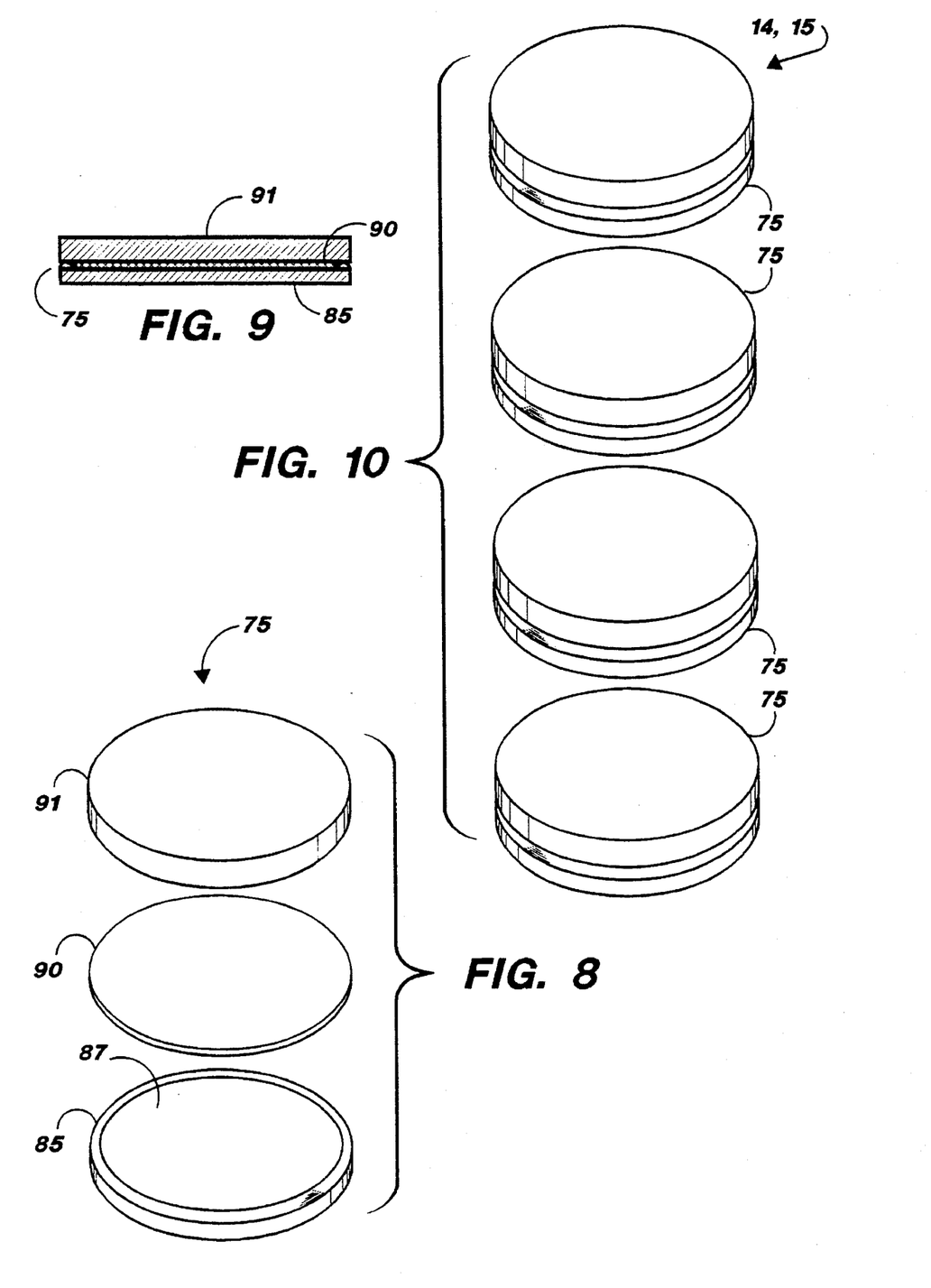
FIG. 8 is an exploded view of a diode layer.
FIG. 9 is a cross-sectional view of an assembled diode layer.
FIG. 10 is an exploded view of a diode stack.
Figure 11:
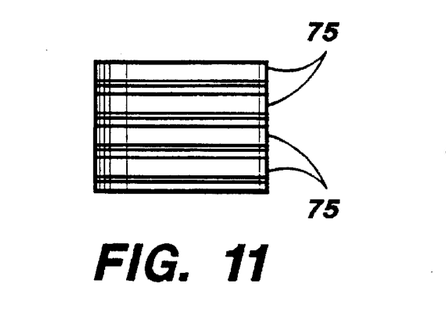
FIG. 11 is a side view of an assembled diode stack.

Each diode stack 14 and 15, as illustrated in FIGS. 10 and 11, is preferably formed of a stack of one or more diode layers 75, with each layer functioning as a diode. The diode layers 75 are stacked such that the diode stack conducts predominantly in only one direction through the stack when the threshold voltage of the diode stack is exceeded. The more stack layers 75 which are included, the higher the turn-on voltage of the stack and the more DC isolation will be provided by the isolation device.

Figure 12:
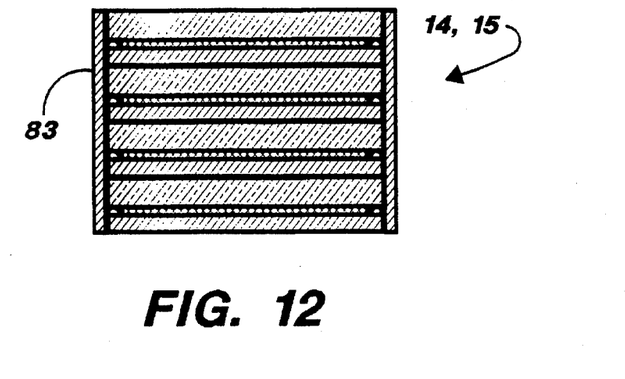
FIG. 12 is a cross-sectional view of a diode stack subassembly which includes a diode stack contained in a polymeric sleeve.

As illustrated in FIG. 12, the diode stack 14 or 15 may be contained in a polymeric sleeve 83 which holds the layers 75 together in a stack subassembly. This sleeve also provides protection of the diode stack from the environment. The diode stack assembly may also be created by bonding the layers of the diode stack together, for example, with solder between the layers, if desired.

Figure 6:
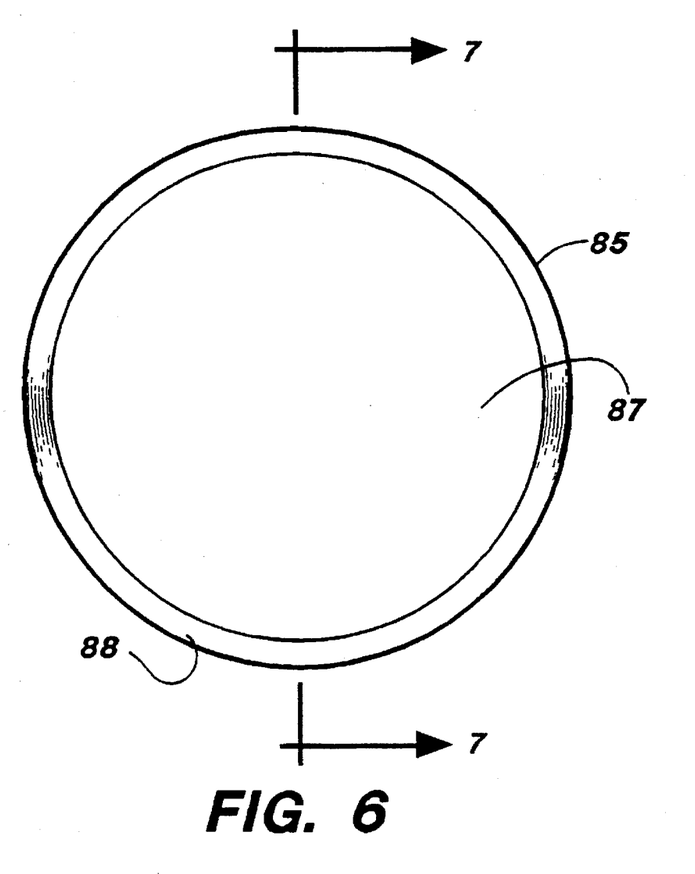
FIG. 6 is a top view of a single diode junction wafer.
Figure 7:
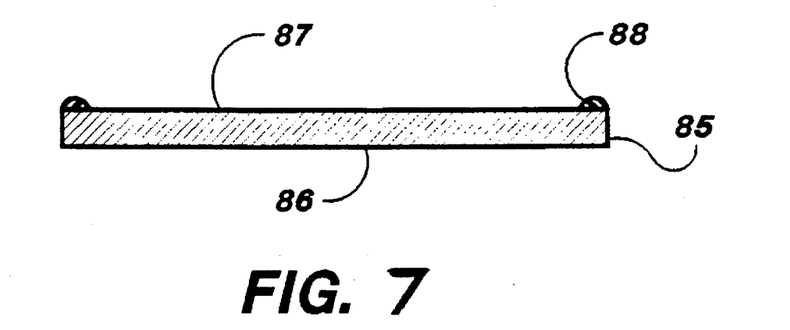
FIG. 7 is a cross-sectional view of the diode junction wafer taken along the line 7—7 of FIG. 6.

At the heart of each diode layer 75 is a diode junction wafer 85 as shown in FIGS. 6–9. Each diode junction wafer 85 may be the die, or junction only, from a standard "hockey puck" style power diode. The diode junction wafers may also be available in special non-standard sizes. The wafers 85 are two-sided, generally of silicon, each wafer having an anode (P-doped) side 86 and a cathode (N-doped) side 87. The joint at the edge of the wafer between the P-doped and N-doped regions is commonly protected by a rubber ring 88. Generally there is a metal disk, such as of molybdenum, alloyed to the silicon and which thus forms the anode side 86 of the wafer. The wafers are disk shaped as shown in FIG. 6. Exemplary suitable wafers are International Rectifier IR24CDR02L (24 mm) and IR38CDR02M (38 mm).

Each diode junction wafer 85 preferably is combined with one or more additional metal separation disks to comprise the diode layer 75, as shown in FIGS. 8 and 9. For example, the layer 75 may include a molybdenum disk 90 and a heat sink/spacer disk 91. The molybdenum disk 90 is placed on the surface 87 of the wafer 85. The molybdenum disk 90 may or may not be bonded to the diode junction wafer, as desired. Typical molybdenum disks include International Rectifier 43-0064-69 (0.040"×0.070" diameter) and 43-0064-99 (0.020"×1.213" diameter) or any similar disks in this size range. This separate disk 90 may also be made of alternative metals, such as tungsten.

The heat sink and spacer disk 91 is placed on top of the molybdenum disk 90. The surfaces of the flat portion of the heat sink disks 91 must be parallel to assure adequate surface contact when the diode layers 75 are stacked together in the clamp assembly 16 to minimize connection resistances. A typical heat sink disk will comprise a ⅛" thick copper disk (though a thicker disk may be used). The copper disk may be plated in nickel (of a few microns only) to prevent oxidation of the copper. An electroless plating process is preferably used because adequate surface flatness and parallelism might not be retained with an electroplating process. The surface area of the disk should not be touched by any plating fixtures or affected in any way by the plating process. The heat sink disk may be, but need not be, the same diameter as the diode junction.

The thickness of the separation disks 90 and heat sink disks 91 may be adjusted so that isolation devices with different ratings may use identical busswork. Since diodes 75 which have higher current ratings will generally be thicker, it may thus be desirable to use thinner separation disks 90 and heat sink disks 91 with such diodes.

The rating of the isolation device—the maximum amount of AC current which it can conduct—is a function of the clamp assembly and diode junctions used. For example, using a diode stack containing four 24 mm diode junctions clamped to 1200–2000 pounds of clamping pressure, the isolation device may have a 60 Hz AC symmetrical current carrying capability for 30 cycles of 3,700 amps rms. Similarly, an isolation device using diode junction stacks containing four 38 mm diode junctions clamped at 3500–4000 pounds clamping pressure may have a 60 Hz AC symmetrical current carrying capability for 30 cycles of 10,000 amps rms.

Operation of the isolation device beyond its recommended rating may cause the diode junction wafers to fail. Should a diode junction fail, however, failure will be in the shorted (low AC/DC impedance) mode. Thus, a failure will cause a short to ground rather than a potential shock hazard.

If equal numbers of diode junction stack layers 75 are used in each stack, the isolation device will be bi-directionally symmetrical. It thus could not be connected in the wrong direction. As noted above, the isolation device 10 may also employ diode stacks which do not have equal number of diode layers 75. The resulting asymmetrical isolation device will have DC blocking capabilities of different voltage levels in each direction, which may be acceptable or even preferable in some applications. Such a device is, however, no longer polarity insensitive and the device must be installed in the proper direction.

It is understood that the invention is not confined to the particular embodiments set forth herein as illustrative, but embraces such modified forms thereof as come within the scope of the following claims.

What is claimed is:

1. An electrical isolation device comprising:

(a) two diode stacks each comprising at least one diode layer and at least one of the stacks having a plurality of layers in stacked relation, each diode layer including a diode junction wafer with an anode side and a cathode side and which is capable of conducting electricity predominantly only in one direction from one side to the other, and at least one conducting metal separation disk in contact with a side of the diode junction wafer, the diode layers stacked with the metal disk of one layer in contact with a side of the diode junction wafer of an adjacent layer such that each diode stack predominantly conducts electricity in only one direction;

(b) a capacitor;

(c) input terminals;

(d) electrical conductors which connect the diode stacks and the capacitor in parallel with each other across the input terminals such that when large fault currents are conducted through the device electricity is predominantly conducted in one direction through one diode stack and in an opposite direction through the other diode stack; and (e) a clamp connected to apply pressure simultaneously to both of the diode stacks and the electrical conductors to press the layers of both of the diode stacks into good electrical contact with adjoining layers and the electrical conductors.

2. The device of claim 1 including an enclosure enclosing the diode stacks, capacitor, electrical conductors, and clamp, the input terminals extending out through a wall of the enclosure.

3. The device of claim 2 further including an encapsulation material filling the interior of the enclosure.

4. The device of claim 2 wherein the input terminals terminate in terminal lugs extending outside the enclosure.

5. The device of claim 1 wherein the two diode stacks contain plural diode layers with each stack having the same number of layers.

6. The device of claim 1 wherein the two diode stacks contain unequal numbers of diode layers.

7. The device of claim i wherein the number of diode layers in each diode stack is chosen such that when an AC current sufficient to cause both diode stacks to conduct is applied to the input terminals there is a net DC voltage across the input terminals of between about −0.70 and −2.50 volts.

8. The device of claim 1 wherein the diode junction of each wafer is formed of silicon and wherein the conducting metal separation disk includes a molybdenum disk with an upper side and a lower side in contact with the cathode side of the diode junction wafer, and wherein each diode layer includes additionally a heat sink disk having two sides wherein one side is in contact with the upper side of the molybdenum disk.

9. The device of claim 8 wherein the heat sink disk is made of copper.

10. The device of claim 1 wherein each diode stack contains plural layers and the plural layers are encased in a polymeric sleeve with open ends to form a diode stack subassembly.

11. An electrical isolation device comprising:

(a) an enclosure having an interior;

(b) first and second input terminals extending from the interior of the enclosure to the outside of the enclosure and connectable outside the enclosure;

(c) a capacitor having first and second electrical terminals;

(d) a first bus conductor connected between a first input terminal of the device and the first terminal of the capacitor and having a first straight flat section and a second straight flat section spaced from the first;

(e) a second bus conductor connected to the second terminal of the capacitor and to the second input terminal and having a straight flat section spaced between the first and second straight flat sections of the first bus conductor;

(f) two diode stacks each comprising plural diode layers, each diode layer having a diode junction wafer with an anode side and a cathode side which is capable of conducting electricity predominantly only in one direction from one side to the other, and at least one conducting metal separation disk in contact with a side of the diode junction wafer, wherein the diode layers are stacked together in each stack such that the diode stack predominantly conducts electricity in only one direction, wherein one diode stack is placed between the first straight flat section of the first bus conductor and the straight flat section of the second bus conductor such that each diode stack conducts electricity predominantly only from the first bus conductor to the second bus conductor and wherein the second diode stack is placed between the second straight flat section of the first bus conductor and the straight flat section of the second bus conductor such that the second diode stack conducts electricity predominantly only from the second bus conductor to the first bus conductor; and (g) a clamp connected to apply pressure to the first and second straight flat sections of the first bus bar, the straight flat section of the second bus bar, and the two diode stacks to press the layers of each stack into good electrical contact with an adjoining layer or sections of the bus conductors.

12. The device of claim 11 wherein the bus conductors are rigid metal conductors and wherein the bus conductors are connected to the capacitor and to the two diode stacks and to the clamp to provide structural support for the capacitor, the diode stacks and the clamp.

13. The device of claim 11 wherein the input terminals terminate in terminal lugs extending outside of the enclosure.

14. The device of claim 13 further including an encapsulation material filling the interior of the enclosure.

15. The device of claim 11 wherein the two diode stacks each contain the same number of diode layers.

16. The device of claim 11 wherein the two diode stacks contain unequal number of diode layers.

17. The device of claim 11 wherein the number of diode layers in each diode stack is chosen such that when an AC current sufficient to cause both diode stacks to conduct is applied to the input terminals there is a net DC voltage across the input terminals of between about −0.70 and −2.50 volts.

18. The device of claim 11 wherein the diode junction of each wafer is formed of silicon and wherein the conducting metal separation disk includes a molybdenum disk with an upper side and a lower side in contact with the cathode side of the diode junction wafer, and wherein each diode layer includes additionally a heat sink disk having two sides wherein one side is in contact with the upper side of the molybdenum disk.

19. The device of claim 18, wherein the heat sink disk is made of copper.

20. The device of claim 11 wherein the plural layers of each diode stack are encased in a polymeric sleeve with open ends to form a diode stack assembly.

21. The device of claim 11 wherein the bus conductors are formed of rigid copper.

22. An electrical isolation device comprising:

(a) two diode stacks each comprising at least one diode layer and at least one of the stacks having a plurality of layers in stacked relation, the number of diode layers in each stack being unequal, each diode layer including a diode junction wafer with an anode side and a cathode side and which is capable of conducting electricity predominantly only in one direction from one side to the other, the diode layers stacked such that each diode stack predominantly conducts electricity in only one direction;

(b) input terminals connectable to electrical lines; and (c) electrical conductors which connect the diode stacks in parallel with each other across the input terminals such that when large fault currents are conducted through the device electricity is predominantly conducted in one direction through one diode stack and in an opposite direction through the other diode stack, and wherein the number of diode layers in each diode stack is chosen such that when an AC current sufficient to cause both diode stacks to conduct is applied to the input terminals there is a net DC voltage across the input terminals of between about −0.70 and −2.50 volts.

23. The device of claim 22 including an enclosure enclosing the diode stacks and electrical conductors, the input terminals extending out through a wall of the enclosure.

24. The device of claim 22 including a capacitor connected by the electrical conductors in parallel with the diode stacks across the input terminals.

25. The device of claim 22 wherein each diode junction wafer is formed of silicon and the diode layers include a molybdenum disk with an upper side and a lower side in contact with the cathode side of the diode junction wafer, and a heat sink disk having two sides wherein one side is in contact with the upper side of the molybdenum disk.

26. The device of claim 25 wherein the heat sink disk is made of copper.

27. The device of claim 22 wherein each diode stack has plural layers in contact with each other and including a clamp engaged to each diode stack to press the layers of each stack together.

28. A method of providing cathodic protection by providing a net DC voltage to a metal structure, comprising the steps of:

(a) providing an electrical isolation device comprising two diode stacks each comprising at least one diode including a diode junction with an anode side and a cathode side, and which is capable of conducting electricity predominantly only in one direction from one side to the other, such that each diode stack predominantly conducts electricity in only one direction, at least one of the diode stacks having a plurality of diode junctions, the number of diode junctions in each stack being unequal; input terminals connectable to electrical lines; electrical conductors which connect the diode stacks in parallel with each other across the input terminals such that when large fault currents are conducted through the device electricity is predominantly conducted in one direction through one diode stack and in an opposite direction through the other diode stack; and wherein the number of diode junctions in each diode stack is chosen such that when an AC current sufficient to cause both diode stacks to conduct is applied to the input terminals there is a net DC voltage across the input terminals of between about −0.70 and −2.50 volts;

(b) electrically connecting one of the input terminals to the metal structure;

(c) electrically connecting the other input terminal to ground; and (d) applying an AC current to the metal structure and across the input terminals sufficient to cause both diode stacks to conduct to provide a net DC voltage to the metal structure of between about −0.70 and −2.50 volts.

29. The method of claim 28 wherein the isolation device further includes a capacitor connected in parallel with the diode stacks across the input terminals.

30. An electrical isolation device comprising:
   (a) a plurality of diode stacks each comprising at least one diode layer, each diode layer including a diode junction with an anode side and a cathode side and which is capable of conducting electricity predominantly only in one direction from one side to the other, the diode layers stacked such that each diode stack predominantly conducts electricity in only one direction;
   (b) a capacitor;
   (c) input terminals;
   (d) electrical conductors which connect the capacitor across the input terminals and connect the diode stacks in a bridge configuration with AC terminals of the bridge which are connected by the conductors across the input terminals in parallel with the capacitor, a diode stack forming each arm of the bridge and the bridge having DC terminals across which one of the diode stacks is connected, such that when large fault currents are conducted through the device electricity is conducted in both directions across the AC terminals of the bridge; and
   (e) a clamp connected to apply pressure simultaneously to all of the diode stacks and the electrical conductors to press the layers of all of the diode stacks into good electrical contact with adjoining layers and the electrical conductors.

31. The device of claim 30 wherein the diode stacks contain unequal numbers of diode layers.

32. The device of claim 31 wherein the number of diode junctions in the diode stacks in the arms of the bridge which conduct current in one direction between the AC terminals of the bridge is greater than the number of diode junctions in the other arms of the bridge.

33. The device of claim 32 wherein the number of diode junctions is chosen such that when an AC current sufficient to cause all diode stacks to conduct is applied to the input terminals there is a net DC voltage across the input terminals of between about −0.70 and −2.50 volts.

34. The device of claim 31 wherein the diode junction of each layer is a wafer formed of silicon, and further including a molybdenum disk with an upper side and a lower side in contact with the cathode side of the diode junction wafer, and a heat sink disk having two sides wherein one side is in contact with the upper side of the molybdenum disk.

35. The device of claim 34 wherein the heat sink disk is made of copper.

* * * * *